(12) United States Patent
Smith

(10) Patent No.: US 6,499,774 B1
(45) Date of Patent: Dec. 31, 2002

(54) RADIAL WEDGE FLANGE CLAMP

(75) Inventor: Karl H. Smith, Yorktown, VA (US)

(73) Assignee: Southeastern University Research Assn., Newport News, VA (US)

( * ) Notice: Subject to any disclaimer, the term of this patent is extended or adjusted under 35 U.S.C. 154(b) by 0 days.

(21) Appl. No.: 09/782,911

(22) Filed: Feb. 14, 2001

(51) Int. Cl.[7] .............................................. F16L 19/00
(52) U.S. Cl. ..................... 285/411; 285/363; 285/367
(58) Field of Search ............................ 285/367, 411, 285/415, 363, 365, 366, 410, 409

(56) References Cited

U.S. PATENT DOCUMENTS

| 222,388 | A | * | 12/1879 | Doty ............................ 285/363 |
| 269,086 | A | * | 12/1882 | McLaughlin .................. 285/411 |
| 2,166,412 | A | * | 7/1939 | Kiesel .......................... 285/411 |
| 3,042,430 | A | * | 7/1962 | Guy ............................. 285/365 |
| 3,500,264 | A | * | 3/1970 | Floyd, Jr. ................... 285/363 X |
| 3,669,474 | A | * | 6/1972 | Bode ........................ 285/365 X |
| 4,065,846 | A | * | 1/1978 | Leonard, Jr. .............. 285/411 X |
| 4,469,354 | A | * | 9/1984 | Caldwell ..................... 285/367 |
| 4,660,869 | A | * | 4/1987 | Gabus ......................... 285/365 |
| 4,662,661 | A | * | 5/1987 | Arnoldt ....................... 285/363 |
| 5,320,391 | A | * | 6/1994 | Luthi ...................... 285/365 X |
| 5,499,849 | A | * | 3/1996 | Fend ....................... 285/411 X |
| 5,597,184 | A | * | 1/1997 | Brenes et al. ........... 285/365 X |
| 5,707,089 | A | * | 1/1998 | Fend ........................... 285/411 |
| 5,876,070 | A | * | 3/1999 | McNealy et al. ....... 285/363 X |
| 5,951,066 | A | * | 9/1999 | Lane et al. ............. 285/411 X |
| 6,050,545 | A | * | 4/2000 | Stolzman ................ 285/411 X |

* cited by examiner

Primary Examiner—Lynne H. Browne
Assistant Examiner—David E. Bochna

(57) ABSTRACT

A radial wedge flange clamp comprising a pair of flanges each comprising a plurality of peripheral flat wedge facets having flat wedge surfaces and opposed and mating flat surfaces attached to or otherwise engaged with two elements to be joined and including a series of generally U-shaped wedge clamps each having flat wedge interior surfaces and engaging one pair of said peripheral flat wedge facets. Each of said generally U-shaped wedge clamps has in its opposing extremities apertures for the tangential insertion of bolts to apply uniform radial force to said wedge clamps when assembled about said wedge segments.

15 Claims, 6 Drawing Sheets

RADIAL WEDGE FLANGE CLAMP

The United States of America may have certain rights in this invention under Management and Operating Contract No. DE-AC05-84ER 40150 from the Department of Energy.

FIELD OF THE INVENTION

The present invention relates to a device for making quick and reliable connection and disconnection of metal seal flanges.

BACKGROUND OF THE INVENTION

The mating surfaces of conventional, commercial wedge flange clamps that use flat or conical wedges that apply axial force to a conical shaped flange do not make full surface contact over the entire range of motion of the clamp. Thus, these clamps are not able to generate the high force needed to achieve tight metal to metal seals. The most common of such wedge flange clamps are identified as band clamps, hinged clamps and chain clamps. In each of these prior art clamps, a band, a hinged peripheral structure or a peripheral chain is used to force a flat or conical wedge clamping mechanism against and over a conical shaped flange. While such devices provide useful clamps each is subject to certain limitations.

For example, in the case of the band and hinged clamps, full surface contact is attained in only at a single point radial position. At other radial positions, the contact reverts to one or two line contacts that are subject to high friction and galling. In the chain clamp, full surface contact does not exist over the entire width of the chain segments but only at points at approximately the midpoint of the chain segment where they are in radial contact with the conical wedge.

Generation of the high axial forces needed to attain a tight metal to metal seal is only possible when full surface contact exists continuously between a flat wedge and a wedge shaped flange at every radial position.

It would therefore be highly desirable to have a wedge flange clamp that achieves full surface contact between a flat wedge and a wedge shaped flange over the entire available surface of both such elements through their entire range of motion.

OBJECTS OF THE INVENTION

It is therefore an object of the present invention to provide an improved interdependent wedge element flange and clamp system that maintains full surface contact between flat wedge clamp segments and matching flat wedge shaped flange facets.

It is another object of the present invention to provide such an improved clamp that is useful in tight physical space installations where axial installation and wrenching of axially disposed bolts or other similar fasteners is difficult or undesirable.

SUMMARY OF THE INVENTION

The radial wedge flange clamp of the present invention comprises a pair of flanges each comprising plurality of flat male peripheral wedge facets attached to or otherwise secured about two elements to be joined and a series of flat female wedge clamps each engaging one pair of said flat peripheral wedge facets and having in their opposed extremities apertures for the tangential insertion of bolts to apply uniform radial force to said wedge clamps thereby forcing the flat surfaces of said flat female wedge clamps against said flat surfaces of said wedge facets when said bolts are tightened.

DETAILED DESCRIPTION

Figure 1:
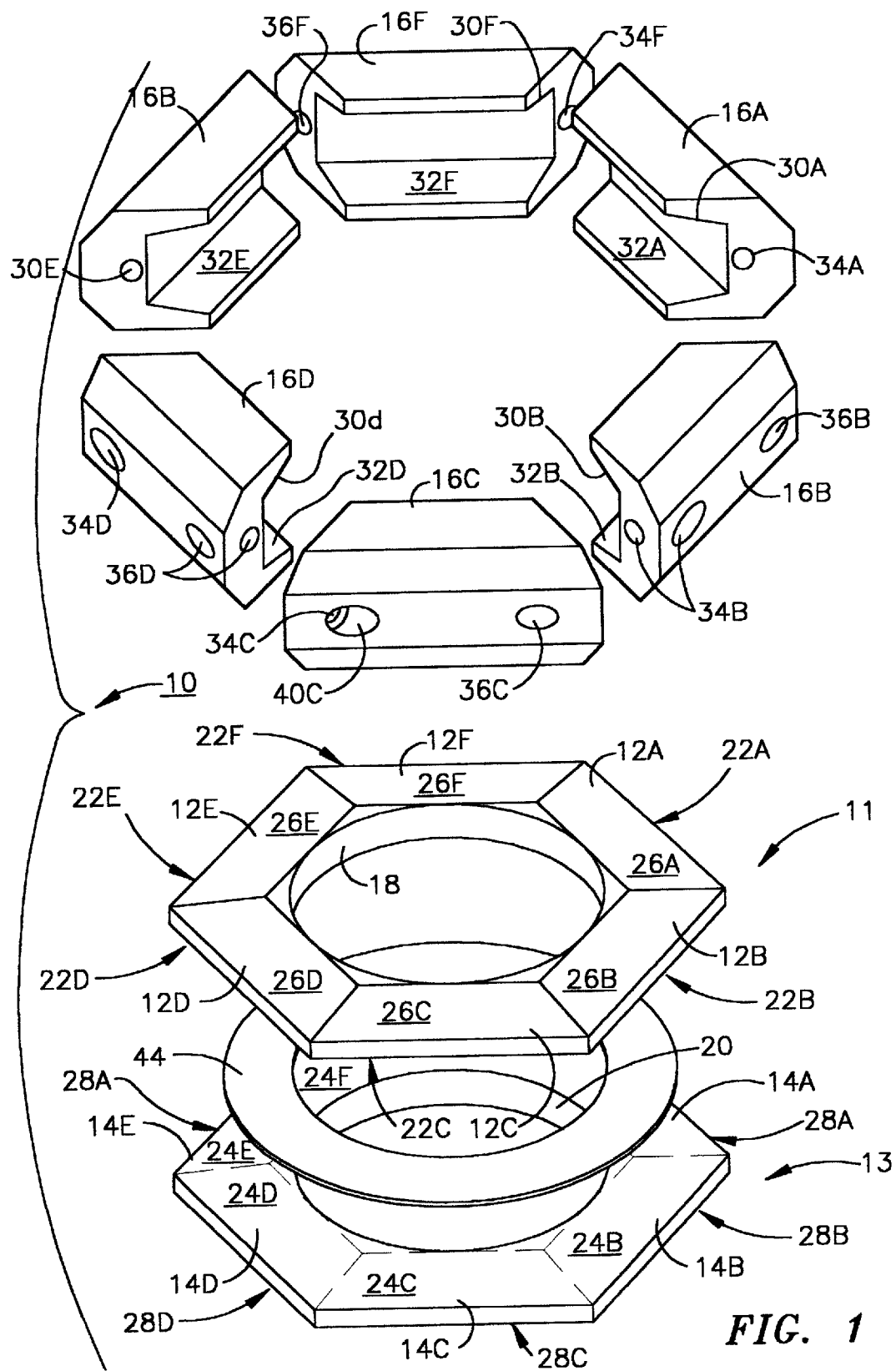
FIG. 1 is an exploded view of the essential elements of the radial wedge flange clamp of the present invention.
Figure 2:
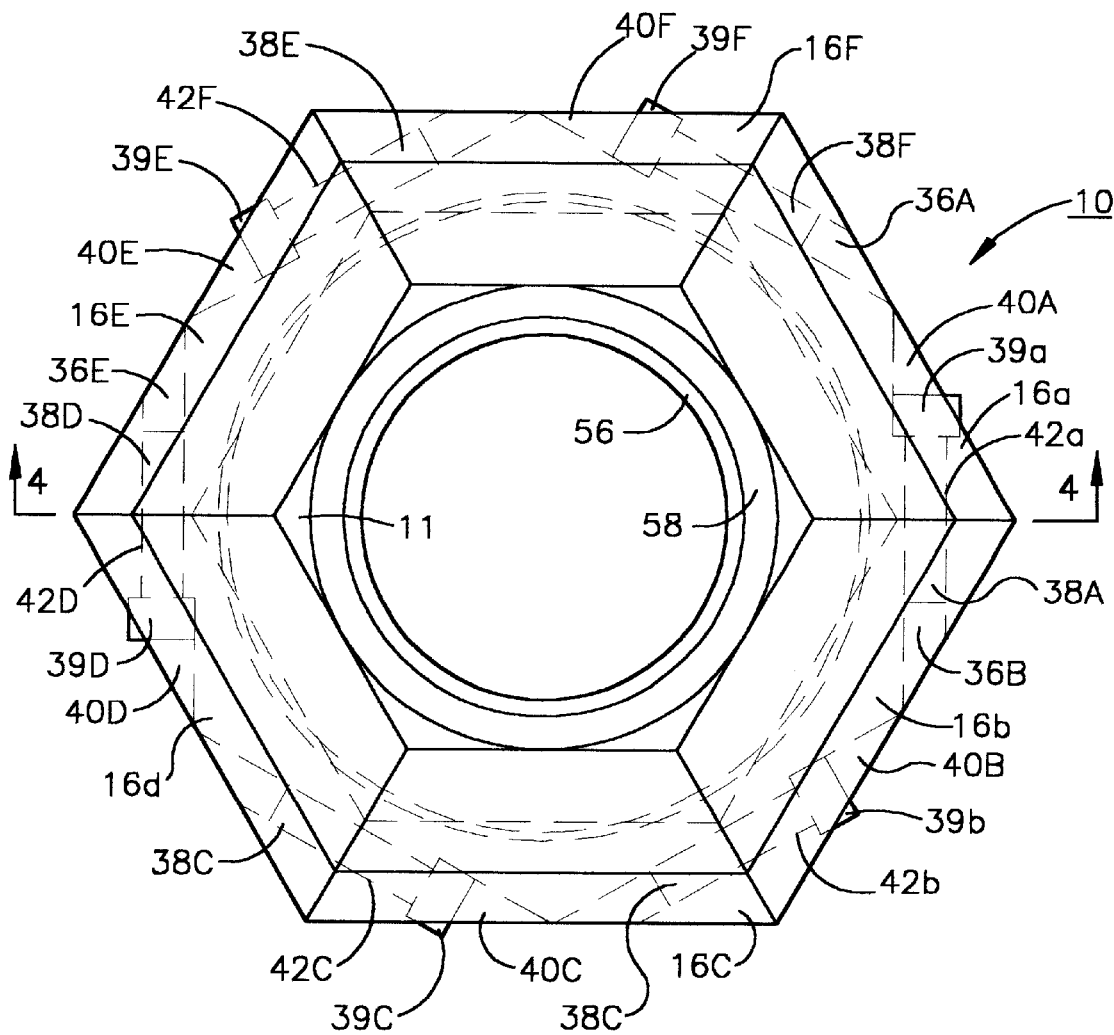
FIG. 2 is a partially phantom plan view of the radial wedge flange clamp of the present invention in its closed or tightened position.
Figure 3:
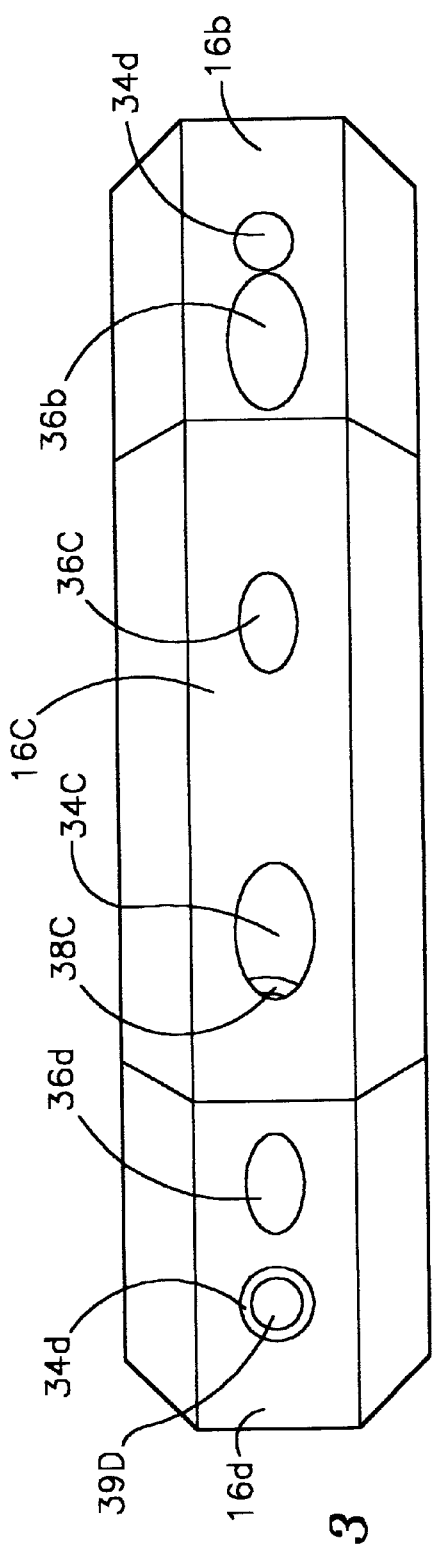
FIG. 3 is a side view of an assembled radial wedge clamp of the present invention.
Figure 4:
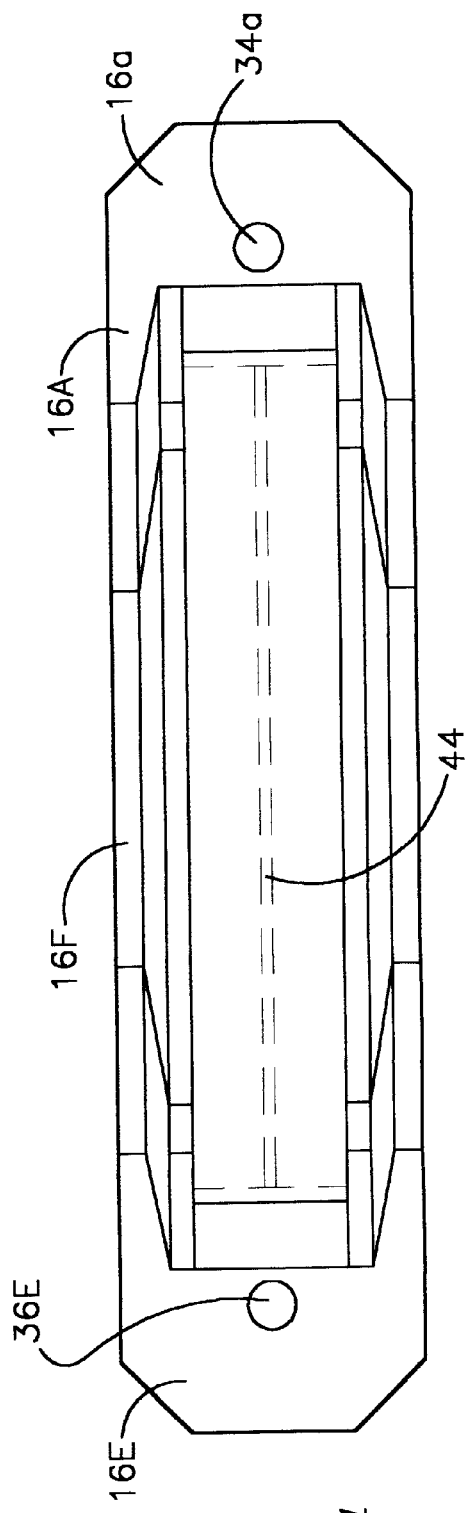
FIG. 4 is a cross sectional view along the line A—A of FIG. 2.

Referring now to FIGS. 1 and 2, radial wedge clamp system 10 of the present invention comprises a pair of mating flanges 11 and 13 each comprising a plurality of peripheral flat wedge facets 12a–12f and 14a–14f integrally formed, attached to or secured about a pair of elements 18 and 20 which are to be joined by a metal to metal seal 44, and an equal plurality of female radial wedge clamps 16a–16f. Each of wedge facets 12a–12f and 14a–14f has a flat mating surface 22a–22f and 24a–24f and a flat wedge shaped surface 26a–26f and 28a–28f respectively. Each of female radial wedge clamps 16a–16f is generally U-shaped and has wedge shaped inner upper surfaces 30a–30f and wedge shaped inner lower surfaces 32a–32f designed and sized to engage and compress against flat wedge shaped surfaces 26a–26f and 28a–28f respectively when female radial wedge clamps 16a–16f are engaged over a pair of peripheral flat wedge facets 12a–12f and 14a–14f after engagement and alignment of flat mating surfaces 22a–22f and 24a–24f. As described to this point radial wedge clamp 10 is quite similar in structure to prior art chain clamp segments. The principal distinction between the clamp segments of the prior art and those of the instant invention lies in the method and mechanism used to secure and tighten the radial wedge clamp segments about the distinctive individual flange facets to complete the radial wedge flange clamp system 10.

Figure 7:
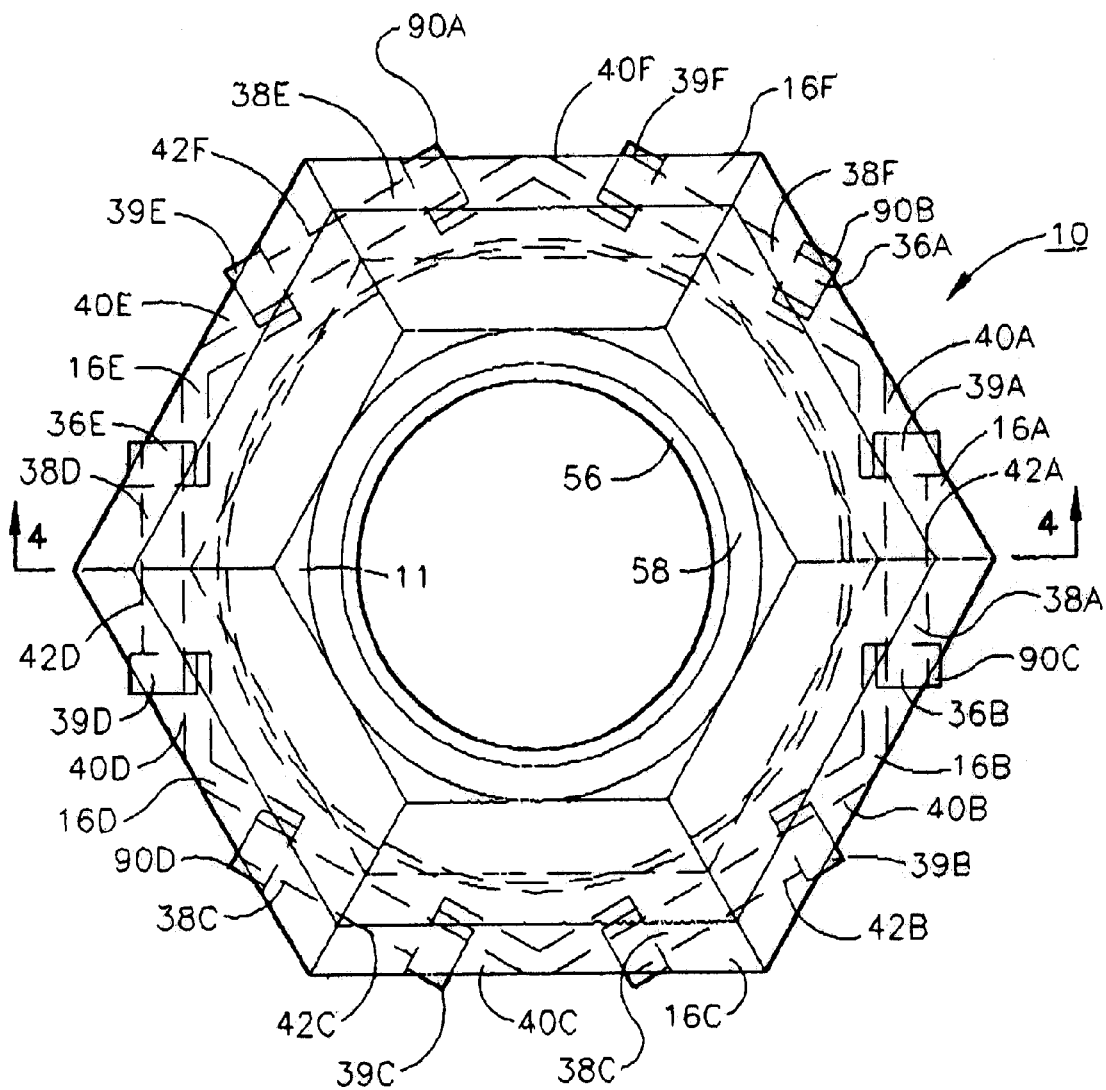
FIG. 7 is a partially phantom view of an alternate preferred embodiment of the radial wedge clamp of the present invention.

According to the present invention, each of radial wedge clamps 16a–16f is provided with a pair of apertures 34a–34f and 36a–36f. Apertures 34a–34f are sized to receive bolts 38a–38f (shown in FIG. 2) and in the assembled configuration shown in FIG. 2 lie in registration. By "in registration" is meant that oppositely numbered and neighboring apertures abut and align with each other. For example, aperture 34a meets aperture 36b; aperture 34b meets aperture 36c, etc in the assembled configuration shown in FIG. 2. Apertures 34a–34f include recessed portions 40a–40f (see FIG. 2) designed to receive the oversized heads 39a–39f of bolts 38a–38f and smooth bore portions 42a–42f (see FIG. 2) that permit passage of bolts 38a–38f without engagement. Apertures 36a–36f on the other hand may be but are not necessarily threaded to receive and engage threads 37a–37f on bolts 38a–38f that have been inserted through apertures 34a–34f and enter apertures 36a–36f. In this arrangement, concurrent or ordered (as described below) tightening of bolts 38a–38f causes radial wedge clamps 16a–16f) specifically, flat surfaces 30a–30f and 32a–32f) to compress against flat wedge shaped surfaces 26a–26f and 28a–28f forcing flat mating surfaces 22a–22f and 24a–24f into intimate and full contact or against seal 44 when used. The plurality of strategically placed tangentially oriented bolts 38a–38f apply great and uniform radial force to a system of wedge elements while never compromising the intrinsic tendency of the wedge elements to maintain full surface contact. The mechanical advantage obtained through the use of threaded fasteners is far superior to and more complete than those demonstrated by the prior art such clamps discussed above that provide less radial force that is confined to single or intermittent pressure points about individual wedge elements. Bolt heads 39a–39f may of course have a variety of tightening mechanisms such as slot heads, Phillips heads or Allen type heads for tightening. According to an alternative preferred embodiment of the present invention, apertures 36a through 36f are smooth bored and nuts 90a–90f are used to engage threads 37a–37f on bolts 38a–38f as they exit apertures 36a–36f (See FIG. 7). Bolts 38a–38f are gradually tightened in ¼ turn increments in the torquing sequence a, c, e, b, f, d which is a conventional and accepted procedure for tightening a series of bolts such as those described hereinabove to obtain even and optimum tightening thereof.

Figure 5:
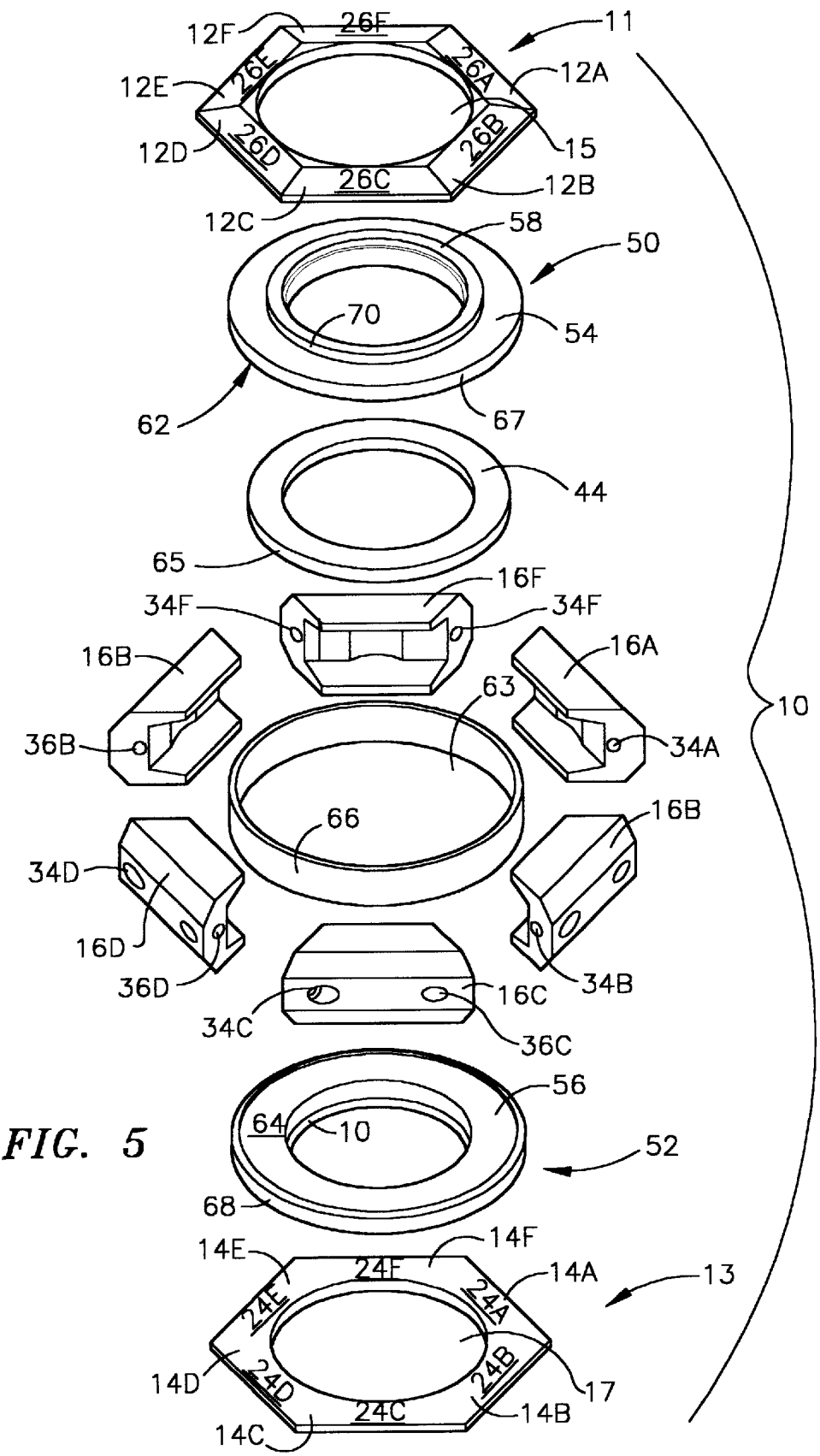
FIG. 5 is an exploded view of an alternative embodiment of the radial wedge clamp of the present invention.
Figure 6:
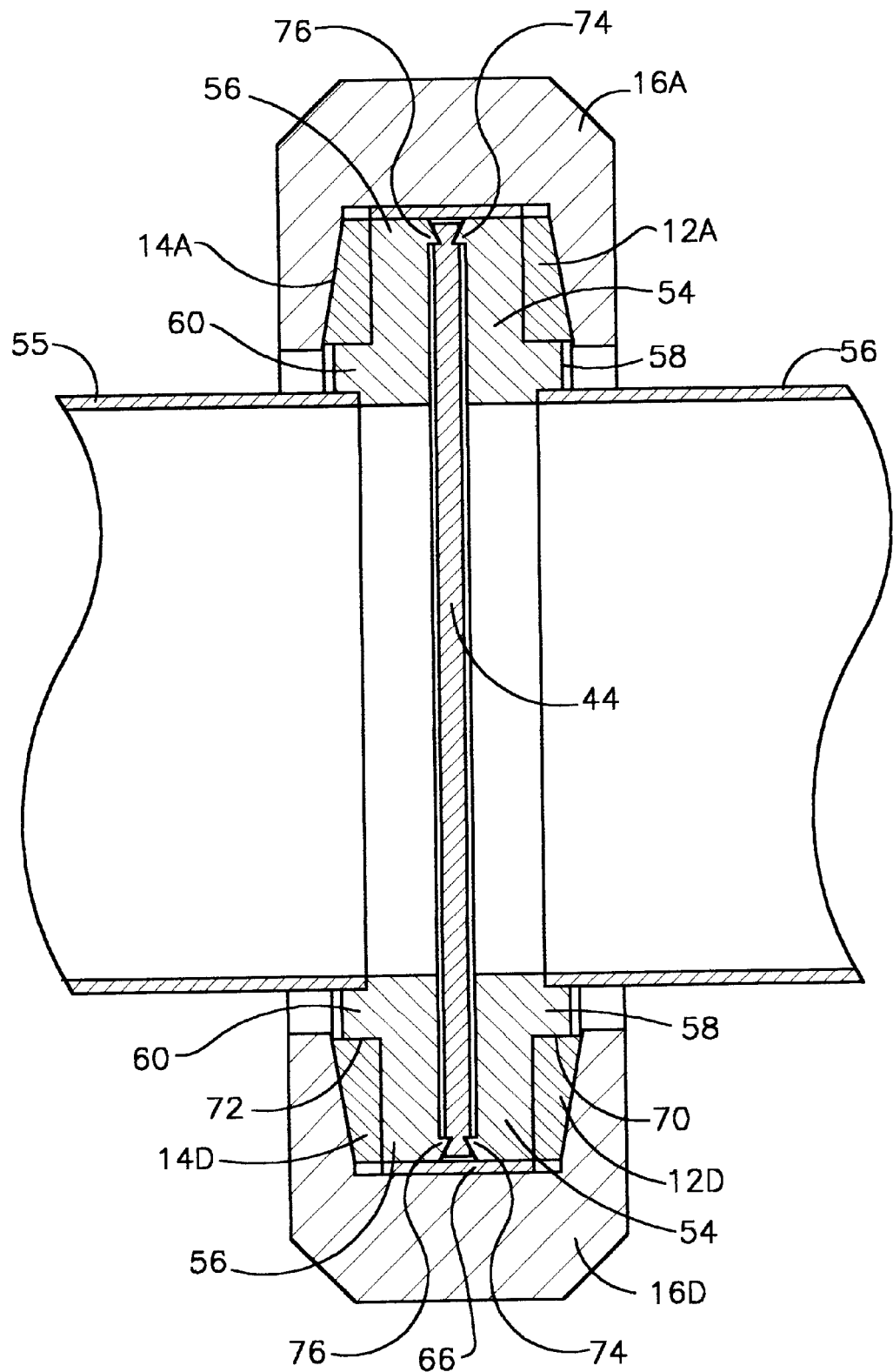
FIG. 6 is a cross-sectional view of the assembled radial wedge clamp of FIG. 5.

Referring now to FIGS. 5 and 6 that depict an alternative preferred embodiment of the radial wedge clamp of the present invention, radial wedge clamp 10 includes all of the essential elements previously described and additional members that simplify installation, and allow for the use of virtually any seal configuration. As shown in FIG. 5, this alternative embodiment of radial wedge clamp 10 includes a pair of mounting flanges 50 and 52 comprised of main body portions 54 and 56 and shoulder portions 58 and 60 integrally formed therewith and extending radially therefrom. Main body portions 54 and 56 are individually attached to mating ends of two tubular members 53 and 55, best shown in FIG. 6, such that shoulder portions 58 and 60 extend away from mating surfaces 62 and 64 of main body portions 54 and 56. Mating ring 66 that includes a central aperture 63 of a diameter to engage the outer peripheries 67 and 68 of main body portions 54 and 56 and outer periphery 65 of seal 44 when mating surfaces 62 and 64 are addressed and brought into contact with each other, in the case of direct metal to metal sealing, or intermediately disposed seal or gasket 44. In this configuration, apertures 15 and 17 of mating flanges 11 and 13 are disposed or engaged about the outer peripheries 70 and 72 of shoulder portions 58 and 60, best seen in FIG. 6. The presence of mating ring 66 serves as a means to retain the entire assembly in a unitary and controllable configuration as mating flanges 11 and 13 as well as female radial wedge clamps 16a–16f are brought into engagement with flat wedge facets 12a–12f and 14a–14f as described hereinabove. As best seen in FIG. 6, mounting flanges 50 and 52 preferably include knife edges 74 and 76 that "cut" into seal 44 when radial wedge clamp 10 is tightened as described above. While the presence of knife edges 74 and 76 is not critical to the successful application of the radial wedge clamp of the present invention in all environments, it is particularly useful in the case of ultra high vacuum joints where complete, intimate and pressure resistant contact is required. Knife edges 74 and 76 may be substituted with whatever feature is required to accept any number of different seal types such as metal O-rings, wire rings and sharp edged seals.

Radial wedge clamp 10 and all of its various elements can be fabricated from any number of materials. Most commonly, such clamps are made of steel or some other appropriate metal, by polymers; for example engineering polymeric materials may also be used. Similarly, hybrid clamps wherein the wedge shaped flanges 11 and 13 are located on a polymeric pipe or other structure, radial wedge clamps 16a–16f may be fabricated from steel or some other metal.

As will be obvious to the skilled artisan, seal 44 as shown in FIG. 1 is preferably used between flat surfaces 22a–22f and 24a–24f. In ultra high vacuum situation, for example at pressures of less than about $10^{-6}$ Torr, seal 44 will comprise a relatively soft or malleable metal such as for example copper that can be deformed by knife edges 74 and 76 upon tightening of bolts 38a–38f as described hereinabove. Cryogenic conditions might also require such metal seal joints. Of course, in less demanding applications, seal 44 may comprise any of the more commonly used rubber or other seal or gasket materials. In many applications, due to the enhanced ability to apply elevated levels of radial pressure to radial wedge clamps 16a–16f, it may be unnecessary to use seal 44, since direct metal to metal or polymer to polymer, in the case of polymeric wedge flanges, may be adequate to provide the required seal.

The number of flange facets 12a–12f and 14a–14f and wedge clamps 16a–16f is, of course largely a matter of design choice. The use of a hexagonal or six-sided arrangement as depicted in the drawings provides an optimized structure from an assembly and engineering standpoint and is therefore preferred.

As the invention has been described, it will be further apparent to those skilled in the art that the same may be varied in many ways without departing from the spirit and scope of the invention. Any and all such modifications are intended to be included within the scope of the appended claims.

What is claimed is:

1. A radial wedge flange clamp comprising:
 A) a pair of flanges each comprising:
  I) a central aperture defining a periphery;
  II) a plurality of individual, radially disposed, peripheral flat wedge facets spaced about said periphery and attached to or engaged about two elements to be joined and each of said peripheral flat wedge facets having an opposed facing flat surface and an oppositely facing wedge-shaped surface,; and
  III) a plurality of generally U-shaped and abutting wedge clamps having a pair of opposing interior wedge shaped surfaces and opposing extremities, arranged to engage a mating pair of said oppositely facing wedge-shaped surfaces from each of said flanges and equal in number to the number of said plurality of peripheral flat wedge facets;
 each of said generally U-shaped wedge clamps engaging one mating pair of said peripheral flat wedge facets and having in their opposed extremities a pair of registering apertures for the tangential insertion of threaded bolts from one of said abutting generally U-shaped wedge clamps to another of said generally U-shaped wedge clamps thereby providing the application of uniform radial force to said wedge clamps when said bolts are concurrently tightened thereby forcing said wedge clamps against said flat wedge facets and said flat surfaces toward each other.

2. The radial wedge clamp of claim 1 further including a seal between said opposed facing flat surfaces.

3. The radial wedge clamp of claim 2 wherein said seal comprises a malleable metal shaped to suit the particular application.

4. The radial wedge clamp of claim 2 further including a knife edge in each of said opposed facing flat surfaces for fully engaging said seal.

5. The radial wedge clamp of claim 1 wherein each of said threaded bolts has an oversized head, one of each of said registering apertures in each of said radial wedge clamps includes an oversized recess for the receipt of said head and the other of said pair of registering apertures is threaded for receipt and engagement of said threaded bolts.

6. The radial wedge clamp of claim 1 wherein each of said threaded bolts has an oversized head, one of each of said registering apertures in each of said radial wedge clamps includes an oversized recess for the receipt of said head and the other of said pair of registering aperture is smooth bored for unrestricted passage of said bolt therethrough and engagement with a nut outside of said bore.

7. The radial wedge clamp of claim 1 fabricated from a material selected from the group consisting of polymers and metals.

8. A radial wedge clamp for joining two tubular members of similar diameter comprising:
A) a pair of flanges each comprising:
  I) a plurality of individual, radially disposed, peripheral flat wedge facets spaced about said central aperture and attached to or engage with one of said tubular members, each of said peripheral flat wedge facets having an opposed facing flat surface and an oppositely facing wedge-shaped surface; and
  II) a plurality of generally U-shaped and abutting wedge clamps having a pair of opposing interior wedge shaped surfaces and opposing extremities and equal in number to the number of said plurality of peripheral flat wedge facets;
each of said generally U-shaped wedge clamps engaging one mating pair of said peripheral flat wedge facets and having in their opposed extremities a pair of registering apertures for the tangential insertion of threaded bolts from one of said abutting generally U-shaped wedge clamps to another of said generally U-shaped wedge clamps thereby providing the application of uniform radial force to said wedge clamps when said bolts are concurrently tightened thereby forcing said wedge clamps against said flat wedge facets and said flat surfaces toward each other.

9. The radial wedge clamp of claim 8 wherein said tubular members to be joined each has an end, each of said pair of flanges has a center aperture and further including:
A) a mounting flange attached to each of said ends and comprising:
  i) a main body portion about the periphery of said end; and
  ii) a radially extending shoulder portion proximate each of said ends;
B) in each of said pair of flanges, a central aperture that peripherally engages one of said shoulders; and
C) a mating ring that peripherally engages said main body portions and said mating ring is encompassed by said generally U-shaped wedge clamps when said generally U-shaped wedge clamps are applied over said flanges and said bolts are tightened.

10. The radial wedge clamp of claim 9 further including a seal between said opposed facing flat surfaces.

11. The radial wedge clamp of claim 10 wherein said seal comprises a malleable metal, shaped to suit the application.

12. The radial wedge clamp of claim 10 further including a knife edge in each of said opposed facing flat surfaces for fully engaging said seal.

13. The radial wedge clamp of claim 9 wherein each of said threaded bolts has an oversized head, one of each of said registering apertures in each of said radial wedge clamps includes an oversized recess for the receipt of said head and the other of said pair of registering apertures is threaded for receipt and engagement of said threaded bolts.

14. The radial wedge clamp of claim 9 wherein each of said threaded bolts has an oversized head, one of each of said registering apertures in each of said radial wedge clamps includes an oversized recess for the receipt of said head and the other of said pair of registering aperture is smooth bored for unrestricted passage of said bolt therethrough and engagement with a nut outside of said bore.

15. The radial wedge clamp of claim 9 fabricated from a material selected from the group consisting of polymers and metals.

* * * * *